United States Patent [19]

Erlichman

[11] Patent Number: 4,865,890

[45] Date of Patent: Sep. 12, 1989

[54] SHRINKABLE ELASTOMERIC SLEEVE

[75] Inventor: Max Erlichman, Sunnyvale, Calif.

[73] Assignee: TTK Kenmark Corporation, Sunnyvale, Calif.

[21] Appl. No.: 173,869

[22] Filed: Mar. 28, 1988

[51] Int. Cl.⁴ .................................. F16L 11/12
[52] U.S. Cl. .................. 428/35.1; 138/166; 138/167; 174/DIG. 8; 428/99; 428/192; 428/913; 285/381; 285/419
[58] Field of Search ............ 428/36, 192, 99, 913, 428/35.1; 138/99, 166, 167, 168; 174/DIG. 8; 285/381, 419

[56] References Cited

U.S. PATENT DOCUMENTS

| | | | |
|---|---|---|---|
| 2,937,664 | 10/1957 | Plummer | 138/168 |
| 3,379,218 | 4/1968 | Conde | |
| 3,530,898 | 9/1970 | Wilson | 138/99 |
| 4,218,814 | 8/1980 | Hodapp | 29/450 |
| 4,241,119 | 12/1980 | Smart | 428/36 |
| 4,371,578 | 2/1983 | Thompson | 428/192 |
| 4,401,218 | 8/1983 | Erlichman | 206/446 |
| 4,422,478 | 12/1983 | Pentney et al. | 138/168 |
| 4,442,153 | 4/1984 | Meltsch | 138/168 |
| 4,442,154 | 4/1984 | Förtsch et al. | 428/99 |
| 4,532,168 | 7/1985 | Steele et al. | 428/99 |
| 4,541,145 | 9/1985 | Sato et al. | 24/19 |
| 4,607,866 | 8/1986 | Erlichman | 285/45 |
| 4,714,277 | 12/1987 | Bachel et al. | 174/DIG. 8 |

Primary Examiner—Ellis P. Robinson
Assistant Examiner—James J. Seidleck
Attorney, Agent, or Firm—Flehr, Hohbach, Test, Albritton & Herbert

[57] ABSTRACT

A protective sleeve comprising a sheet of sleeve-forming, chemically-dilated, elastomeric material which shrinks upon exposure to ambient air. The sheet has first and second opposed edges that can be brought into adjacency. The protective sleeve further includes a locking device comprising two locking members extending from the respective opposite edges of the sleeve. The locking members are formed of a material that is dimensionally stable upon exposure to air and substantially more rigid than the material from which the sleeve is made. The locking members provide a rigid locking surface which can adjoin the opposed edges of the sleeve to retain those edges in adjacency when the sleeve is positioned about a pipe, conduit, cable, or like member, and then exposed to ambient air to shrink around such a member.

10 Claims, 1 Drawing Sheet

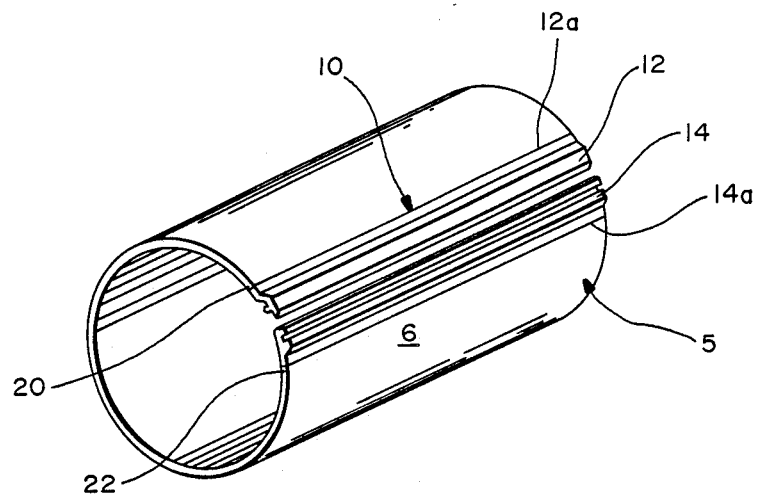
FIG.—1
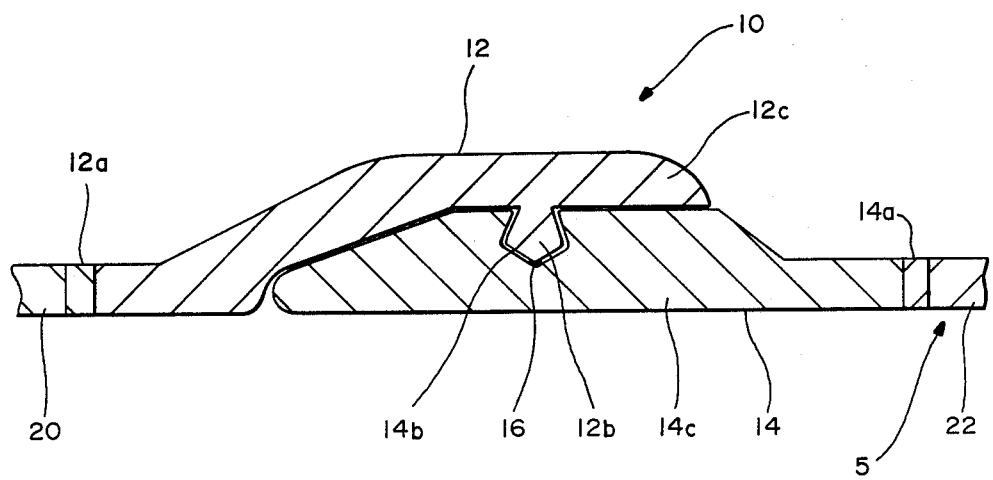
FIG.—2

SHRINKABLE ELASTOMERIC SLEEVE

BACKGROUND OF THE INVENTION

The present invention relates to a new and improved chemically-dilated, elastomeric sleeve, and more particularly to an improved apparatus for connecting the opposite edges of such a sleeve when it is wrapped around an elongated pipe, cable, conduit, or similar member.

It has been known heretofore that certain types of shrinkable protective tubing may be used for protecting joints, fittings and welds by which pipes, cables, conduits, and other elongated members are joined, one to the other, in an elongated string. One well-known type of material for forming such protective sleeves is a heat shrinkable type, which, when applied over a joint and subjected to heat, shrinks tightly into contact with the members forming the joint.

These types of sleeves and means for connecting them about a pipe, cable or the like are disclosed in the following U.S. Pat. Nos.: 3,379,218; 3,530,898; 4,218,814; 4,241,119; 4,371,578; 4,442,154; 4,532,168; and 4,541,145.

Another type of shrinkable tubing material, and that to which the present invention is particularly addressed, is a shrinkable protective tubing which has been dilated with chemicals to bring the same to a dilated or enlarged state. This type of tubing remains dilated or enlarged so long as it is kept out of contact with the air. However, once the tubing contacts ambient air, it shrinks back to its initial size without any application of heat.

A device for joining the opposite sides of such a sleeve is disclosed in U.S. Pat. No. 4,607,866, also issued to the inventor of the present application. The prior disclosure of this patent is hereby incorporated by reference.

The device disclosed in U.S. Pat. No. 4,607,866 comprises rods that extend through passageways extending along the opposed edges of the sleeve. Alternating and opposing male and female members project from the rods through apertures in the sleeve edges to interlock the rods together, to thus retain the sleeve edges in a juxtaposed position.

These rods, however, are not directly attached to the sleeve, and as such the lock is not as positive as it could be. Additionally, since the sleeves are dilated both longitudinally and laterally, a longer rod is required to accommodate the lateral dilation or expansion of the sleeve. Thus, when the sleeve shrinks, the lock is relatively loose because of use of the longer rod.

Further, the shrinkable protective tubing utilized heretofore has required the use of a "flap". The function of the flap is to prevent any moisture or water from seeping underneath the sleeve through apertures created by the various locking devices. The flap extends below these apertures, protecting the underlying pipe or member from moisture. The inclusion of a flap on the protective tubing not only complicates manufacture but also creates difficulty in the proper placement of the protective tubing or sleeve on a pipe or other member.

The present invention contemplates an improved locking apparatus formed as an extension and integral part of the opposed edges of a chemically-dilated, elastomeric sleeve that shrinks upon exposure to ambient air. The apparatus provides a positive lock that more securely joins the opposed edges of the sleeve. The locking apparatus of the present invention also facilitates installation of the sleeve about in situ piping.

Additionally, the present invention does not require the use of a flap, since no aperture is created by the locking device of the present invention.

SUMMARY OF THE INVENTION

The present invention is directed to a protective sleeve that includes a sheet of sleeve-forming, chemically-dilated, elastomeric material which shrinks upon exposure to ambient air. The sheet has first and second opposed edges that can be brought into adjacency when the sleeve is placed in position about a pipe, cable, conduit or similar member. The sleeve further includes first and second locking members extending from respective ones of the first and second opposed edges along the lengths thereof as an integral part of the sleeve. The locking members are formed of a material that is dimensionally stable upon exposure to air and that is substantially more rigid than the elastomeric material from which the sleeve is formed. The locking members are adapted to engage one another to retain the first and second opposed edges of the sleeve in adjacency.

The locking members may further include flange portions or members by which the locking members are adjoined to the edges of the sleeve. The flange portions may be formed of the elastomeric material. Alternatively, the flange members may be formed of the same material from which the locking members are formed. The flange members may be high-frequency welded to the opposed edges of the sleeve.

The first locking member may comprise a male connector member extending along the length of the first sleeve edge, and the second locking member may comprise a female connector member extending along the length of the second sleeve edge. The male and female connector members are adapted to matingly engage to retain the opposed edges of the sleeve in adjacency.

BRIEF DESCRIPTION OF THE DRAWINGS

FIG. 1 is a perspective view of the protective sleeve of the present invention; and FIG. 2 is a fragmentary side view of the sleeve of the present invention wherein the opposite edges of the sleeve have been brought into an interlocking relationship.

DESCRIPTION OF THE PREFERRED EMBODIMENTS

Referring now to the drawings in further detail, there is shown in FIG. 1 a sheet of sleeve-forming material converted into a tubular configuration or sleeve generally designated 5. The sleeve is formed of an elastomeric material of any suitable and stretchable material such as rubber or plastic. One advantageous material for the sheet 6 which forms the sleeve is ethylene propylene diene monomer (EPDM) and another is polyvinylchloride (PVC).

The material forming sheet 6 is preferably chemically-dilated, as, for example, by application of a solvent to the material of the sleeve. This causes the sleeve to become enlarged or dilated in size. At this stage the sleeve-forming material may be inserted in a laminated, sealed pouch for shipment and storage until it is ready for use. Thereafter, it may be removed from the pouch for installation. When the solvent evaporates or volatizes by exposure to ambient air, the sleeve simply shrinks back from its dilated or enlarged size to its original size.

Sleeve 5 has opposed first and second side marginal edges or areas 20 and 22 which are brought into adjacency with respect to each other when the sleeve is formed into a cylindrical configuration, as illustrated in FIG. 1. This is the configuration in which the sleeve is normally used when it is placed about a pipe, cable, conduit or similar member.

As shown in FIGS. and 2, protective sleeve 5 further includes a lock or engagement apparatus 10 for adjoining the opposed edges 20, 22 of the sleeve when it is placed about a pipe or the like. The lock includes a male member 12 and a female member 14 located at the opposed sides 20 and 22, respectively, of sleeve 5. Male member 12 further includes a flange portion 12a and female member 14 includes a flange portion 14a.

In one embodiment, flange portions 12a and 14a are formed of the same material as sleeve 5, i.e. a chemically-dilated, elastomeric material which shrinks upon exposure to ambient air, e.g. PVC. Locking members 12 and 14, however, are formed of a material that is substantially more rigid then the elastomeric material so as to provide a rigid lock that securely joins the opposed edges of the sleeve. Preferably, locking members 12 and 14 are formed of such materials as polypropylene or polyethylene.

The flange portions 12a,14a and member 12,14 may be co-extruded, and the flanges secured to the respective edges of the sleeve by, for example, high frequency welding. The thickness of the flanges would be approximately the same as that as the sleeve, i.e. about 0.0042 of an inch.

In another embodiment, the flanges would be formed of a rigid material that does not dilate when exposed to chemicals utilized to treat the sleeve material. The flanges may be formed of the same material from which members 12,14 are made, and they would be thinner than the sleeve, i.e. on the order of about 0.0021 of an inch. The flanges may again be welded to the edges of the sleeve.

As can be seen in FIG. 1, the male locking member 12 extends along the entire length of edge 20 of sleeve 5, and the female locking member 14 similarly extends along the entire length of edge 22. This feature advantageously provides an interlocking action along the entire length of the respective opposed edges 20,22 when they are brought in adjacency relative to each other.

As illustrated, locking member 12 may include a ridge or a longitudinally extending projection 12b that extends from body 12c of locking member 12. Female locking member 14 includes a groove or recess 14b in its body 14c that is sized and shaped to matingly receive ridge or projection 12b.

As noted above, the present invention does not require the use of a flap to prevent water or moisture from seeping underneath the sleeve and into contact with the pipe or other member about which the sleeve is secured. The device of the present invention, however, may further include a small bead 16, for example one made of butyl rubber mastic applied along the length of the female groove 14b. The use of bead 16 provides a seal through which moisture or water will not penetrate. This bead forming the waterproof seal may be approximately 0.040 inches in diameter. After mating, the bead spreads out to form a substantially waterproof seal. It should be understood that in the context of the present invention locking members 12 and 14 may take some other form, configuration or shape which provides the interlocking action sought by the present invention.

In use, sleeve 5 may be pre-molded to the approximate configuration of a pipe, cable, conduit or similar member to which it is to be secured, although it will be somewhat larger in size to permit it to be slipped over the juncture of two such members, for example. The male and female members 12 and 14 will be interconnected with one another and sleeve 5 will thus be loosely retained in position surrounding and protecting the area to which it is to be joined. As the material 6 of sleeve 5 is exposed to the ambient air, it begins to shrink. The locking members 12,14, however, are dimensionally stable when exposed to the ambient air. Thus, they do not shrink. Once the sleeve has shrunken sufficiently to engage the pipe, further shrinkage will be precluded. At this point, the entire sleeve will be tightly engaged throughout its full length with the cable, pipe, conduit, or like member.

As the sleeve material 6 shrinks to the diameter of the member on which it is used, the locking action provided by the locking apparatus 10, i.e. members 12,14, increases. That is to say, ridge or projection 12b of locking member 12 is more securely engaged within recess or groove 14b of locking member 14.

The protective sleeve of the present invention may be configured in various dimensions. For instance, it may have a width of 12 or 16 inches. If the sleeve is 12 inches wide, then locking members 12,14 will be approximately 12 inches long. The sleeve of the present invention may be used on smaller pipes or larger pipes, for example, pipes 54 inches in diameter.

As it is known in this art, the material 6 from which sleeve 5 is formed is extremely pliable. In the dilated state, it loses approximately 50 percent of its tensile strength but regains that strength upon exposure to ambient air. The locking apparatus of the sleeve of the present invention provides a hard locking face and thus a secure lock as the sleeve shrinks and conforms to the configuration of the pipe, for example, on which it may be used.

After reading the foregoing detailed description, it will be apparent to those skilled in the art that various changes may be made in the non-essential features of the present invention, without departing from the spirit and scope of the invention as defined in the accompanying claims.

What is claimed is:

1. A protective sleeve, comprising:
   a sheet of sleeve-forming chemically-dilated, elastomeric material which shrinks upon exposure to ambient air, said sheet having first and second opposed side marginal areas that can be brought into adjacency;
   first and second locking members extending from respective ones of said first and second side marginal areas along the lengths thereof, as an integral part of said sleeve, said locking members formed of a material that is dimensionally stable upon exposure to air and substantially more rigid than said elastomeric material and said locking members adapted to engage one another to retain said first and second side marginal areas in adjacency;
   said first locking member comprising a male connector member extending along the length of said first side marginal area and said second locking member comprising a female connector member extending along the length of said second side marginal area for matingly engaging said male connector member such that said male and female connector members engage one another substantially contiguously along their respective mating surfaces; and said male and female connector members presenting surfaces substantially free of any projections when engaged.

2. The sleeve of claim 1 further including a flange extending from each of said first and second locking members and said flanges secured to respective ones of said first and second side marginal areas.

3. The sleeve of claim 2 wherein said flanges and said locking members are formed of the same material.

4. The sleeve of claims 1 or 3 wherein said locking members are formed of a material selected from the group consisting of polypropelene or polyethylene.

5. A protective sleeve, comprising:
a sheet of sleeve-forming chemically-dilated, elastomeric material which shrinks upon exposure to ambient air, said sheet having first and second opposed edges of said sleeve that can be brought into adjacency;

first and second flange members joined to respective ones of said first and second opposed edges along the lengths thereof, said first and second flange members formed of said elastomeric material;

first and second locking members projecting from respective ones of said first and second flange members along the lengths thereof, said locking members formed of a material substantially more rigid than said elastomeric material and adapted to engage one another to retain said first and second opposed edges of said sleeve in adjacency;

said first locking member comprising a male connector member extending along the length of said first edge and said second locking member comprising a female connector member extending along the length of said second edge for matingly engaging said male connector member such that said male and female connector members engage one another substantially contiguously along their respective mating surfaces; and said male and female connector members presenting surfaces substantially free of any projections when engaged.

6. The sleeve of claim 5 wherein said first and second flange members are high-frequency welded to respective ones of said first and second opposed edges of said sleeve.

7. The sleeve of claim 5 wherein said first and second locking members are dimensionally stable upon exposure to ambient air.

8. The sleeve of claim 7 wherein said locking members are formed of a material selected from the group consisting of polypropelene or polyethylene.

9. The sleeve of claim 8 further including a bead extending substantially along the length of said female connector member to provide a substantially waterproof seal.

10. The sleeve of claim 1 or 5 wherein said male connector member comprises a pentagonal-shaped projection and said female connector member comprises a similarly shaped recess for receiving said projection.

* * * * *

UNITED STATES PATENT AND TRADEMARK OFFICE
CERTIFICATE OF CORRECTION

PATENT NO. : 4,865,890
DATED : September 12, 1989
INVENTOR(S) : Max Erlichman

It is certified that error appears in the above—identified patent and that said Letters Patent is hereby corrected as shown below:

Column 3, line 10, after FIGS add --1--.

Signed and Sealed this

Twenty-seventh Day of November, 1990

Attest:

HARRY F. MANBECK, JR.

*Attesting Officer*          *Commissioner of Patents and Trademarks*